United States Patent
Olson et al.

(10) Patent No.: US 6,528,781 B1
(45) Date of Patent: *Mar. 4, 2003

(54) DETECTION APPARATUS AND METHOD USING DIGITALLY ENCODED SERIAL DATA

(75) Inventors: Gary R L Olson, Belle Plaine; Eardley L. Ham, Chaska; Andrew J. Pichotta, Minneapolis, all of MN (US)

(73) Assignee: Control Products, Inc., Chanhassen, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/419,547

(22) Filed: Oct. 18, 1999

Related U.S. Application Data (63) Continuation-in-part of application No. 09/289,902, filed on Apr. 12, 1999, now Pat. No. 6,265,709, which is a continuation-in-part of application No. 08/876,303, filed on Jun. 16, 1997, now Pat. No. 5,902,998.
(60) Provisional application No. 60/037,286, filed on Feb. 4, 1997.

(51) Int. Cl.[7] ................................................. H01J 40/14
(52) U.S. Cl. ..................... 250/221; 250/214 R; 250/573
(58) Field of Search .............................. 250/221, 222.1, 250/214 R, 214 AL, 573, 577, 559.4; 356/379; 340/555–557

(56) References Cited

U.S. PATENT DOCUMENTS 4,437,499 A * 3/1984 Devale ........................ 141/95
5,491,333 A * 2/1996 Skell et al. ............... 250/222.1
5,744,793 A    4/1998 Skell et al. ............... 250/222.1
5,761,919 A    6/1998 Wilson et al. ................ 63/138
5,902,998 A * 5/1999 Olson et al. ................ 250/221

* cited by examiner

Primary Examiner—Que T. Le
(74) Attorney, Agent, or Firm—Skinner and Associates (57) ABSTRACT

A detection apparatus comprising a device adapted for transmitting a transmitted serial data stream and receiving a received serial data stream, and further comprising a sensor adapted for receiving the transmitted serial data stream from the device, returning the received serial data stream to the device when a transmission medium is in a Data Pass Through State, and not returning the received serial data stream to the device when the transmission medium is in a No Data Pass Through State. The transmission medium is influenced by an external event. The device verifies the received serial data stream against the transmitted serial data stream to verify the transmission medium is in the Data Pass Through State and to determine whether the external event has influenced the transmission medium. The invention further includes a method for detecting an external event, comprising the steps of: transmitting transmitted serial data streams; selectively returning the transmitted serial data streams as received serial data streams when a transmission medium is in a Data Pass Through State, wherein the transmission medium is influenced by an external event; receiving said received serial data streams; and verifying said received serial data streams against said transmitted serial data streams to determine if the external event has influenced the transmission medium.

22 Claims, 11 Drawing Sheets

DETECTION APPARATUS AND METHOD USING DIGITALLY ENCODED SERIAL DATA

CROSS-REFERENCE TO RELATED APPLICATIONS, IF ANY

This application is a continuation-in-part of application Ser. No. 09/289,902, filed Apr. 12, 1999, now U.S. Pat. No. 6,265,109 which is C-I-P of Ser. of Ser. No. 08/876,303 filed Jun. 16, 1997, now U.S. Pat. No. 5,902,998, and further claims the benefit, under 35 U.S.C. 119(e), of U.S. provisional application Serial No. 60/037,286, filed Feb. 4, 1997.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention.

The present invention relates, generally, to detection apparatus and methods. More particularly, the invention relates to detection apparatus and methods that use digitally encoded serial data streams. The invention provides a means to control a variety of equipment, devices or processes based upon an external event that influences a transmission medium into either a Data Pass Through State or a No Data Pass Through State. The verification of the error-free return of the transmitted encoded serial data stream provides proof that, depending on the design of the system, the external event either has or has not occurred. The apparatus and methods of this invention may be used in conjunction with commercial and institutional food service beverage and ice dispensing systems, medical and pharmaceutical dispensing systems, automated manufacturing and production systems, food processing systems, packaging systems, and a variety of other systems.

2. Background Information.

A difficulty with known detection apparatus and methods is distinguishing valid signals from noise. This invention employs digital data error detection principles to verify that a received signal accurately matches a transmitted signal to indicate whether an external event has or has not occurred. Noise rejection or avoidance in sensor systems has usually been attacked using one of two methods. The first method simply looks for "clean" time slots without noise and transmits signals during these clean time slots. The second method transmits a master-clocked continuous pulsed signal and a corresponding master-clocked synchronous signal, and then verifies that the received signal exactly matches both the transmitted pulsed and synchronous signals. This invention differs significantly from known art. No attempt is made to pre-filter the noise to a relatively low level with respect to the signal nor to identify "clean" time slots in which to transmit a signal. Moreover, this method does not depend on a master clock, a continuous pulsed signal, or a corresponding synchronous circuit. Rather, the present invention transmits a serial data stream. Both the data content and the period between serial data stream transmissions may be varied. This asynchronous transmission of digitally-encoded serial data streams provides an effective method for distinguishing valid signals from noise.

The present invention can be used for both proximity based and non-proximity based detection systems. U.S. Pat. No. 5,902,998 and U.S. patent application No. 09/289,902, now U.S. Pat. No. 6,289,902, both assigned to applicants' assignee Control Products, Inc. and hereby incorporated by reference, disclose the digital data error detection principles of the present invention as part of a proximity detection apparatus for detecting objects within a predetermined region, and more specifically as part of a drink dispenser. A broad category of non-proximity based applications is fluid detection. Any fluid that is at least as conductive as water can be used as a data transmission medium. The present invention can detect fluid level and flow, and can perform other traditional fluid detection functions, and further can detect the presence of a conductive fluid that is the result of a specific step within a complex process. One such application exists in automatic ice making machines, wherein the completion of the ice making cycle is determined by detecting the presence of water in a precise predetermined region.

A common method of making ice includes the step of running or sheeting water over a cold surface. The cold surface may be a grid in which the grid element dimensions determine the width, height, and thickness of ice cubes. The grid is thermally connected to evaporation coils of refrigeration equipment. To produce ice cubes, refrigerant is circulated through the evaporator coils to cool the ice cube grid well below the freezing point of water. Water is delivered through holes in a water trough positioned above the grid. Water runs down over the ice cube grid and flows into the grid cavities due to the Coanda effect. Excess water is collected in a reservoir trough and recirculated back to the water trough. Individual cubes are formed within the grid cavities as the sheets of water freeze. Ice begins to bridge the barriers or grid elements between cavities after the cavities are filled. The refrigeration and water sheeting are stopped when the cubes reach the desired thickness. The cubes usually are harvested into a storage bin by running hot refrigeration gas through the evaporator coils so as to warm the grid enough to release the cubes.

As described in U.S. Pat. No. 5,761,919, known methods for monitoring the thickness of ice cubes include mechanical ice detectors which actuate when the ice builds out enough to touch a microswitch actuator, thermal ice detectors which present a unique thermal signature to the detector when in contact with ice, and electrical resistance ice detectors which forms a semiconducting bridge between a pair of probes when the ice builds out and forces the water into contact with the probes. The '919 patent further describes that the mechanical ice detector suffers from mechanical problems such as ice sticking to the actuating surfaces, switch hysteresis, and tolerances, that the thermal ice detector suffers from a poor signal to noise ratio, and that the electrical resistance ice detector suffers from lime buildup, electrolysis and electrode corrosion. Electrolysis involves a chemical reaction that occurs when a DC current is passed through the water. The '919 patent discloses a method for detecting the thickness of the cubes by mounting a metal sense plate in front of the ice cube grid to establish an air gap between the sense plate and ice cube grid. Wires connect the sense plate and the ice cube grid to sensing circuitry. The sense plate, the ice cube grid and the air gap form a capacitor, wherein the sense plate and grid are the electrodes and the air and ice are the dielectric. As the ice increases in thickness, the water sheet is forced outward until it finally contacts the sense plate. The capacitance of the sensor plate changes since the dielectric constant of water differs from that of air. The sensing circuitry detects the predictable change in the capacitance and signals that the cubes have reached the desired thickness. However, the capacitance may be adversely affected by lime buildup on the sense plate.

This invention provides a detection apparatus and method which is believed to constitute an improvement over existing technology.

BRIEF SUMMARY OF THE INVENTION

The present invention provides a detection apparatus and method that uses digitally encoded serial data streams and the principals of digital data transmission, reception, and error detection to detect the occurrence of an external or a physical event that influences a transmission medium between a Data Pass Through State and a No Data Pass Through State. This invention uses a sensor that selectively enables or disables data from passing through from a sensor input to a sensor output, i.e. data loop back, depending on whether the transmission medium is in the Data Pass Through State or the No Data Pass Through State. A serial data stream is received and verified by control circuitry of the apparatus when the sensor enables a data loop back. This detection scheme is highly tolerant of external noise from a variety of sources. Furthermore, by using a suitable microcontroller or microprocessor, the data content of each transmission and the period between each transmission may be varied. The asynchronous serial data transmission used in this scheme nearly eliminates the dedicated hardware and electronics required by other noise filtering schemes. Additionally, the transmitter and receiver may be located at some distance from the microcontroller or microprocessor by incorporating data line drivers.

Any sensor or sensors may be used that can selectively enable a data loop back by accepting a serial data stream and returning it. Data is received at an input of the sensor and passes through to an output of the sensor if the data loop back is enabled. The data loop back is enabled when the transmission medium is in the Data Pass Through State and the data loop back is disabled when the transmission medium is in the No Data Pass Through State. A software program operating within the microcontroller generates transmitted serial data streams and receives received serial data streams from the sensor output. The processor or microcontroller then verifies or compares the received serial data stream to the transmitted serial data stream. If the received serial data stream exactly matches the transmitted serial data stream, the microcontroller determines that the transmission medium is operating in the Data Pass Through State which, depending on the design of the system, indicates whether or not the anticipated external event has occurred. However, if the received serial data stream does not exactly match the transmitted serial data stream, then the transmission medium may be operating in the No Data Pass Through State or the signal received may have been produced by noise.

The digital data error detection principles of the present invention use a method of error checking similar to traditional full-duplex data transmission in which a remote device in communication with a computer echoes any data received from the computer immediately back to the computer. The computer, having received exactly the same data as it transmitted, has a reasonable expectancy that the remote device received error-free data. In this embodiment, the echo is enabled by the data loop back of the sensor when the transmission medium is in the Data Pass Through State. Because the detected signal is a bit-oriented or digital serial data stream rather than a fixed frequency pulse, more rigorous error detection methods may be invoked to further improve the rejection of externally-generated noise. The asynchronous digitally encoded serial data transmission, reception and error checking of the present invention provide increased resistance to periodic noise and inherent resistance to random noise. Furthermore, the present invention does not pre-scan for possible interference. A single low cost microcontroller or microprocessor performs the control functions of the present invention. With respect to fluid detection applications, the present invention eliminates noise problems caused by spurious drops of water or by electrical devices, and minimizes electrolysis and corrosion by using a stream of digital data rather than a steady-state DC current. The electrolysis may further be minimized by alternating the logic levels of the signal associated with the digital data stream.

The features, benefits and objects of this invention will become clear to those skilled in the art by reference to the following description, claims and drawings.

DETAILED DESCRIPTION

Figure 1:
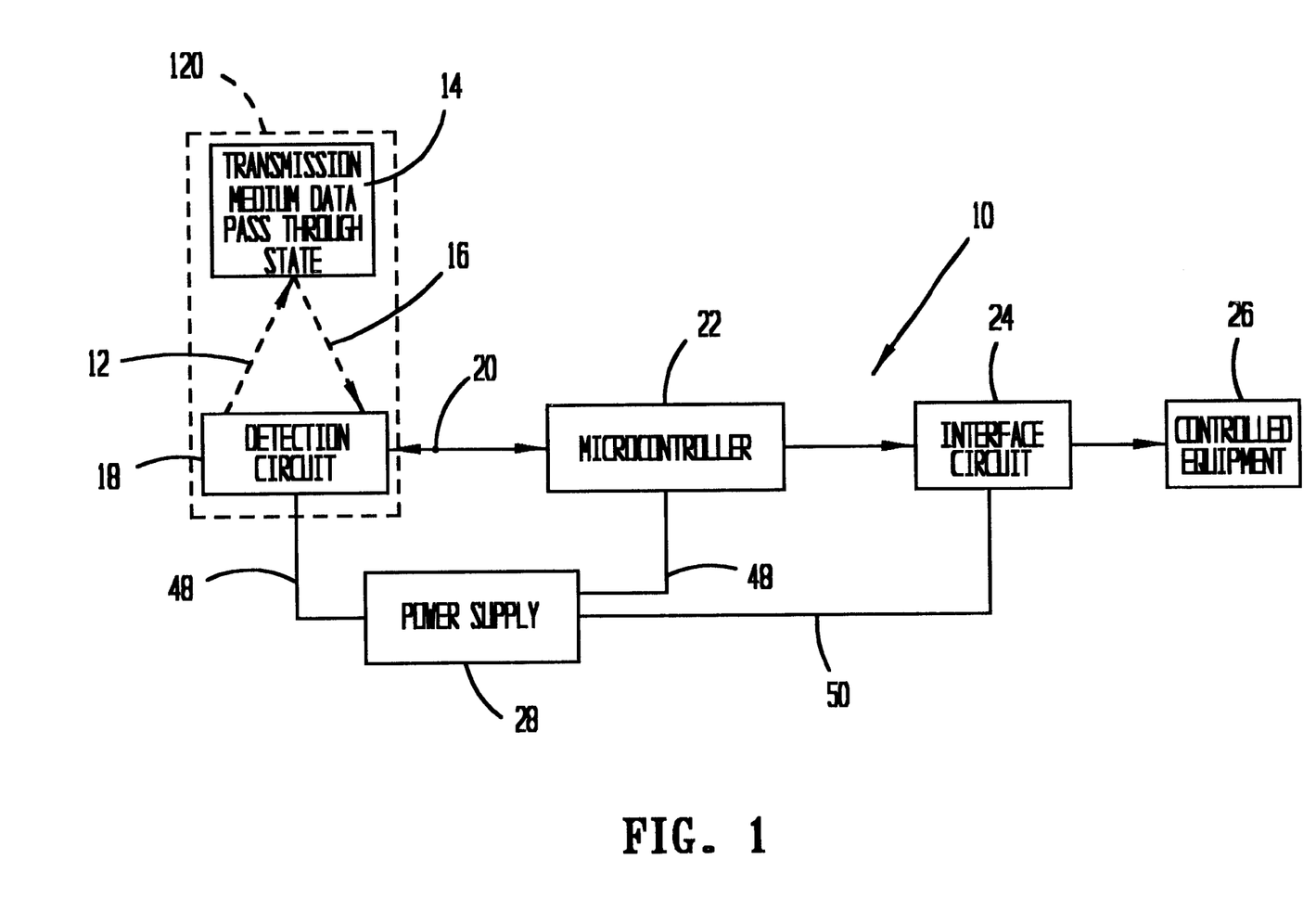
FIG. 1 illustrates a block diagram of the circuitry of the present invention.

A block diagram of a preferred embodiment of the present invention is shown in FIG. 1.

The detection apparatus 10 transmits an encoded serial data stream 12, which depending on the state of a transmission medium 14 that is influenced by an external event, returns a serial data stream 16 and verifies that the returned data stream exactly replicates the transmitted data stream 12 to indicate, depending on the design of the system, whether or not the external event occurred. A sensor 120 generally includes a detection circuit 18 and the transmission medium 14, which are described in more detail with respect to FIGS. 5a, 5b, 6a and 6b. The detection circuit 18 communicates over a bidirectional asynchronous serial data link 20 with a microcontroller 22 or microprocessor. The microcontroller 22 uses a suitable interface circuit 24 to influence the controlled equipment 26, system or process. A regulated power supply 28 powers the detection circuit 18, microcontroller 22, and interface circuits 24. A real-time control program operates within the microcontroller 22. The control program sends, receives, and validates serial multi-bit digital data streams to and from the detection circuit 18. The software is described in more detail after the rest of the invention is disclosed.

Figure 2:
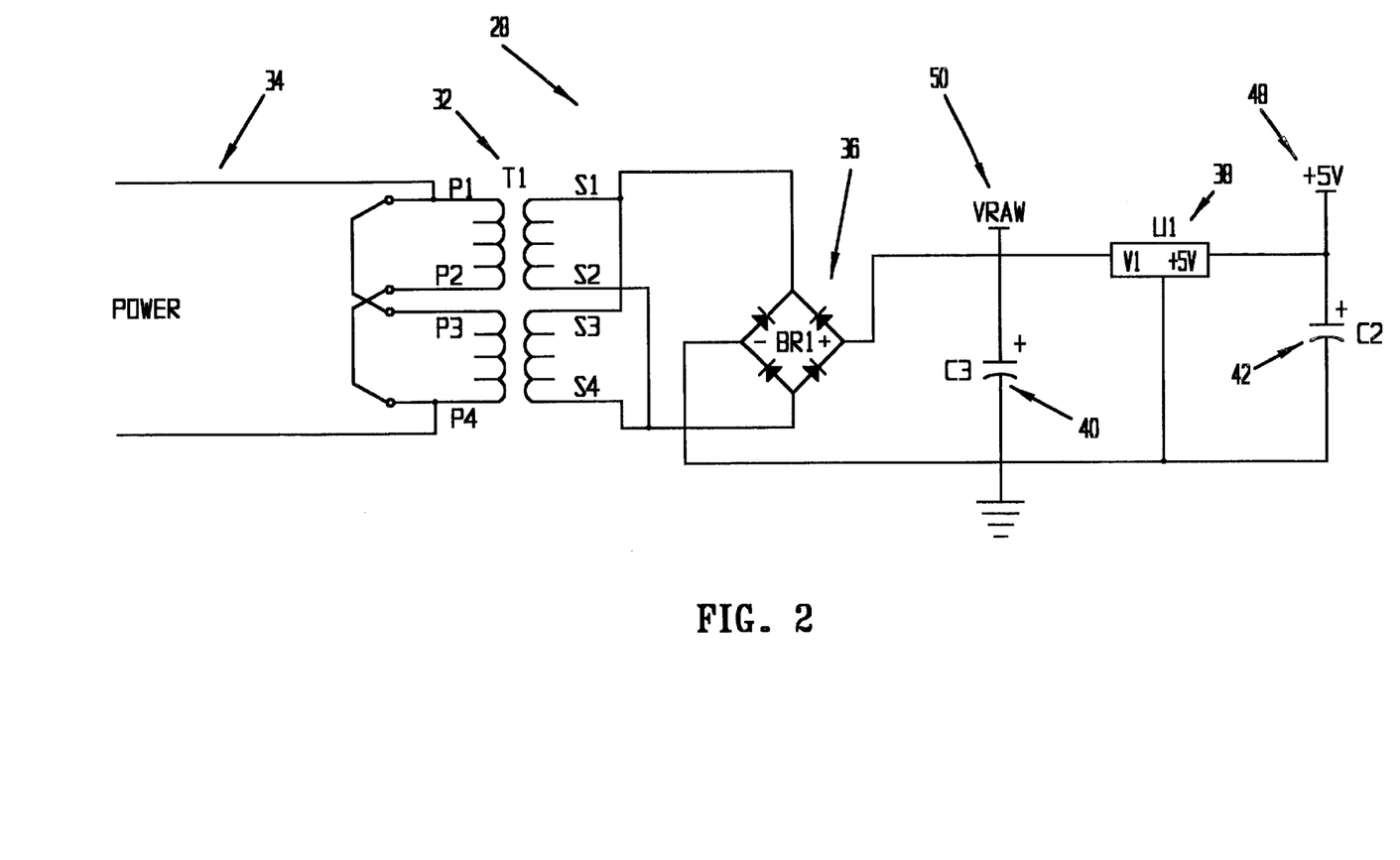
FIG. 2 illustrates the regulated power supply shown in FIG. 1.

A traditional, low-cost regulated power supply 28 is shown in FIG. 2. It includes a transformer 32 which reduces 120 or 240 VAC power 34 to 12 VAC, a full-wave rectifier bridge 36 which converts the 12 VAC to 12 VDC, and an integrated circuit voltage regulator 38 which, with filter capacitors 40 and 42, provides a constant output potential 48 of five volts to power the detection circuit 18 and the microcontroller 22. The power supply 28 also provides unregulated 12 VDC or VRAW 50 to power the load relays 52 in the interface circuit 24.

Figure 3:
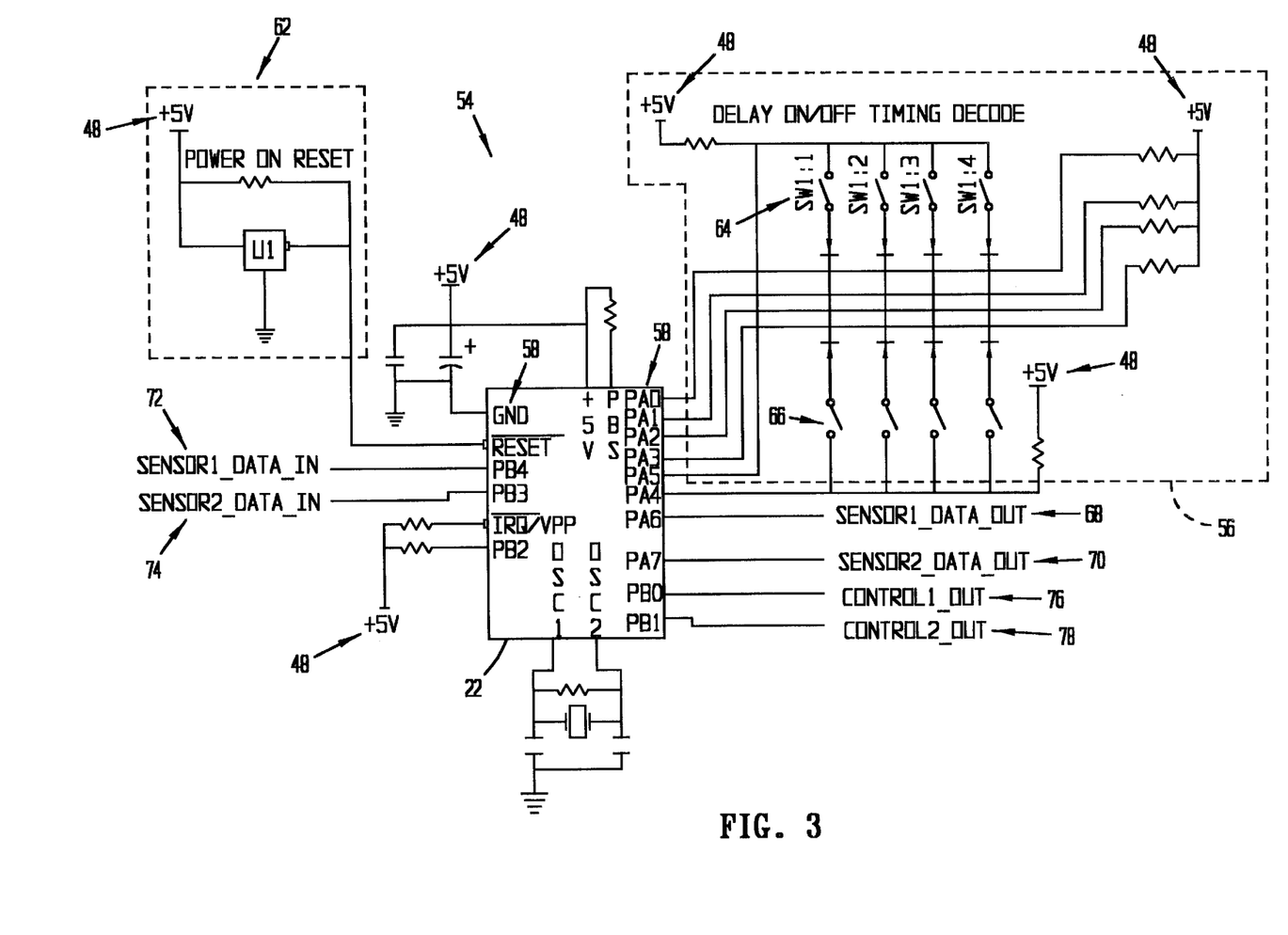
FIG. 3 illustrates the related circuitry for the microcontroller shown in FIG. 1.

A microcontroller circuit 54 is depicted in FIG. 3. It is capable of supporting two detection circuits 18 and providing on/off control to two interface circuits 24. As shown in FIG. 3, the sensor data input/output function uses individual port pins 58, each of which is programmed as an input or output via a data direction register within the microcontroller 22 during initialization. Likewise, the control outputs are driven via individual port pins 58, also programmed as outputs during initialization. The microcontroller 22 has a reset circuit 62 that insures a stable initialization on power-up by holding pin U2:RESET low until the regulated supply voltage 48 rises above a predetermined threshold. This microcontroller circuit 54 also allows, by virtue of the DELAY ON/OFF TIMING DECODE section 56, a system-wide selectable on delay and selectable off delay operation. On initialization, the selectable delay timings used by the control program are established by scanning the DELAY ON/OFF TIMING DECODE section 56. Two four-bit binary numbers (from $0-15_{10}$), representing the open/closed patterns of the selectable on delay switches 64 and the selectable off delay switches 66, function as an index for a table of predetermined on delay and off delay times. The microcontroller 22 forms the four-bit binary value for the on delay time by manipulating and reading the logic state of the port pins 58 connected to the on delay switches 64. First, pin U2:PA3 is pulled low and the state of pin U2:PA5 is tested. If pin U2:PA5 is low, then switch SW1:4 is closed and yields a binary "0." If pin U2:PA5 is high, then switch SW1:4 is open and yields a binary "1." Pin U2:PA3 is then driven high again before decoding the next switch. The process is repeated using the U2:PA2/U2:PA5 pin pair to decode switch SW1:3, the U2:PA1/U2:PA5 pin pair to decode switch SW1:2, and the U2:PA0/U2:PA5 pin pair to decode switch SW1:1. Likewise, pin U2:PA4 and pins U2:PA3-U2:PA0 are used to decode the off delay switches 66 and form a four-bit binary number to index a table of predetermined off delay times.

SENSOR1_DATA_OUT 68 and SENSOR2_DATA_OUT 70 transmit serial data streams to a sensor input portion of the detection circuits 18. A serial data stream is formed by toggling the appropriate port pin U2:PA6 or U2:PA7, wherein a high output is driven for a binary "1" and a low output is driven for a binary "0." The bit timing is predetermined by program constants which set approximately a fifty microsecond delay between bit outputs. The data source is determined by the control program, embodiments of which are described in more detail below.

SENSOR1_DATA_IN 72 and/or SENSOR2_DATA_IN 74 receive serial data from a sensor output portion of the detection circuits 18. Bits are read serially by testing the state of LO pin U2:PB3 and/or pin U2:PB4 immediately after each bit transmit/delay sequence. A received bit is considered valid only if it matches the transmitted bit. A valid_bit_counter, initialized to 0, is incremented for each valid reception. Thus, the transmission of an eight-bit data burst is considered valid if and only if the valid_bit_counter value is equal to eight.

Figure 4:
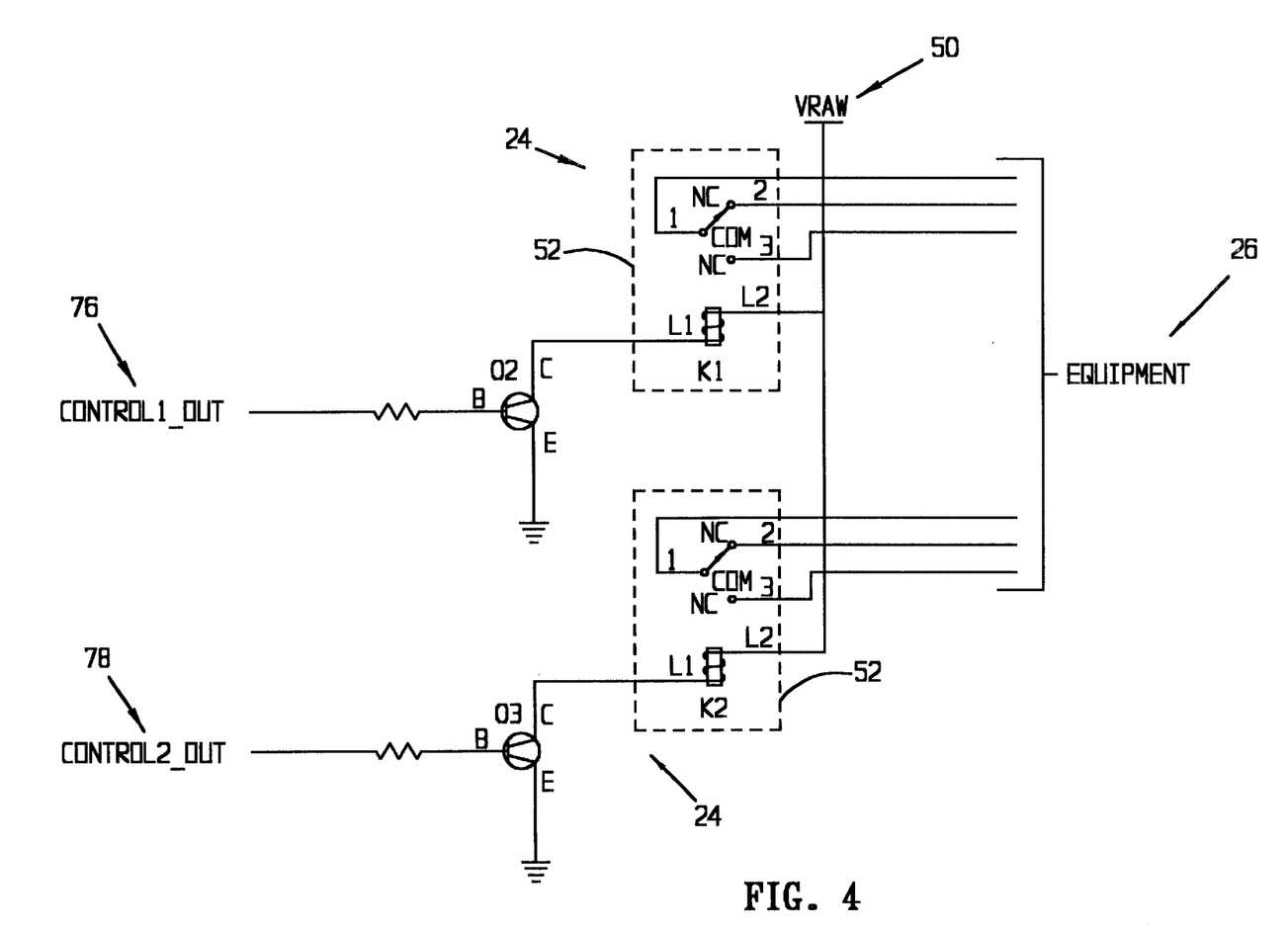
FIG. 4 illustrates an example of the interface circuit shown in FIG. 1.

Outputs to the interface circuit, CONTROL1_OUT 76 and CONTROL2_OUT 78, are controlled by the microcontroller program as required by the control application. As shown in FIG. 4, CONTROL1_OUT 76 and CONTROL2_OUT 78 are each electrically connected to an interface circuit 24, which is connected to the controlled equipment 26. The design of the interface circuit 24 is specific to the type of equipment 26 or system to be controlled and process to be performed. FIG. 4 illustrates an interface circuit 24 that uses load relays 52.

The data transmission technique of the present invention may be used with any sensor device 120, including the detection circuit 18 and transmission medium 14 illustrated in the figures, that is capable of selectively enabling or disabling a "data loop back" function, i.e. a sensor 120 capable of accepting a serial data stream and returning it based upon an external event. The external event influences a transmission medium 14 between a Data Pass Through State in which data passes through between an input 122 and output 124 of the sensor 120 and a No Data Pass Through State in which data is prevented from passing through between the input 122 and the output 124 of the sensor 120. For example, in U.S. Pat. No. 5,902,998, the optical transmitter and receiver function as the detection circuit 18 of the sensor 120 and the object functions as the transmission medium 14 in the Data Pass Through State by reflecting the signal from the transmitter to the receiver when present within the predetermined region.

A simple mechanical switch 126, which is generally illustrated in FIGS. 5a, 5b, 6a and 6b, may be used to illustrate the Data Pass Through State and the No Data Pass Through State of the transmission medium. SENSORx_DATA OUT 68, 70 of the microcontroller 22 is connected to the input 122 of the sensor 120 and SENSORx_DATA_IN 72, 74 of the microcontroller 22 is connected to the output 124 of the sensor 120. When the sensor 120 has enabled a data loop back, the signal transmitted from SENSORx_DATA_OUT 68, 70 is transmitted through the sensor and is reflected as an identical signal received by SENSORx_DATA_IN 72, 74.

Figure 5A:
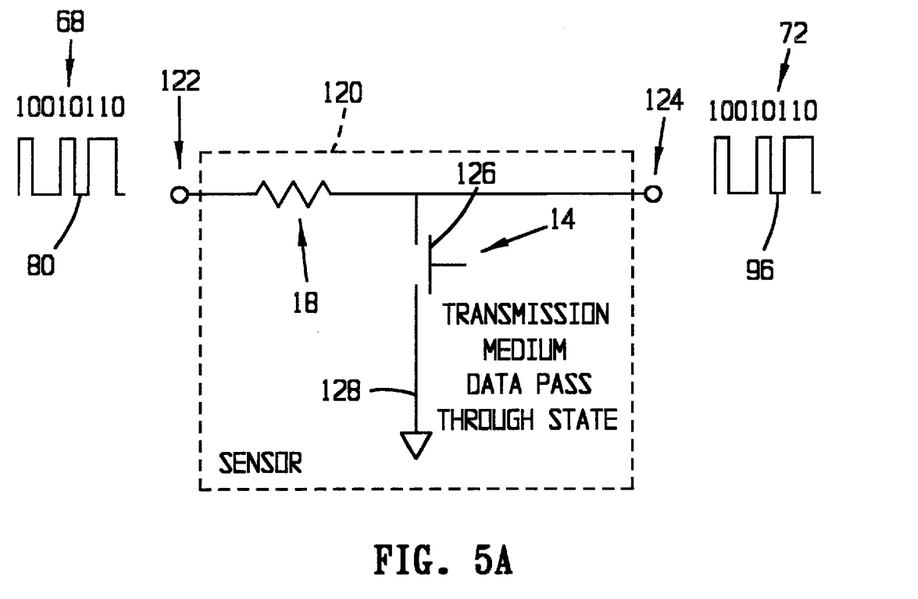
FIG. 5a is a schematic illustration of a sensor enabling a data loop back when a transmission medium is in a Data Pass Through State.
Figure 5B:
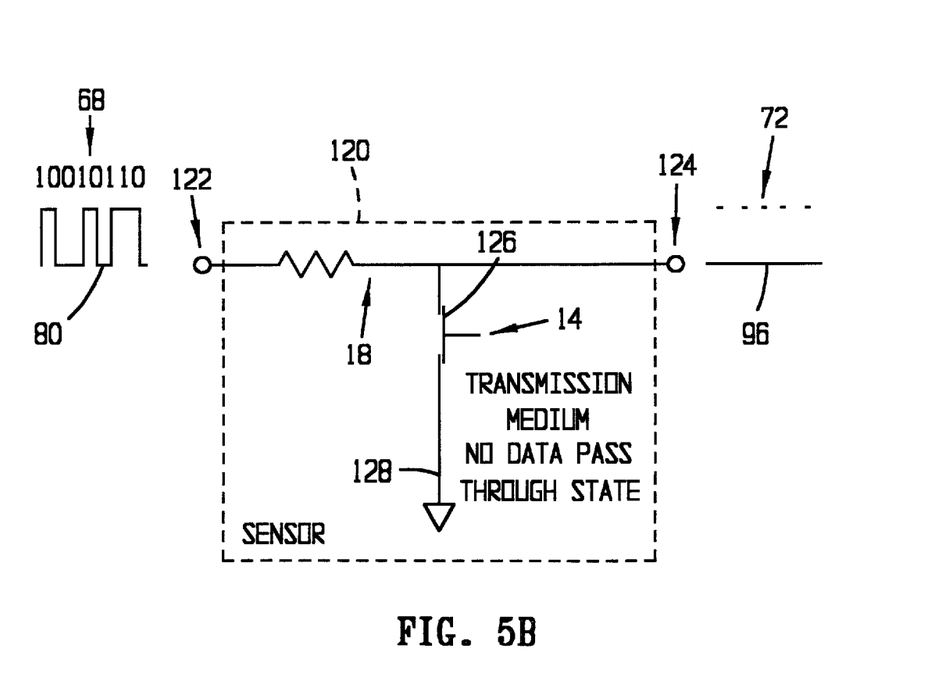
FIG. 5b is a schematic illustration of a sensor disabling a data loop back when a transmission medium is in a No Data Pass Through State.
Figure 6A:
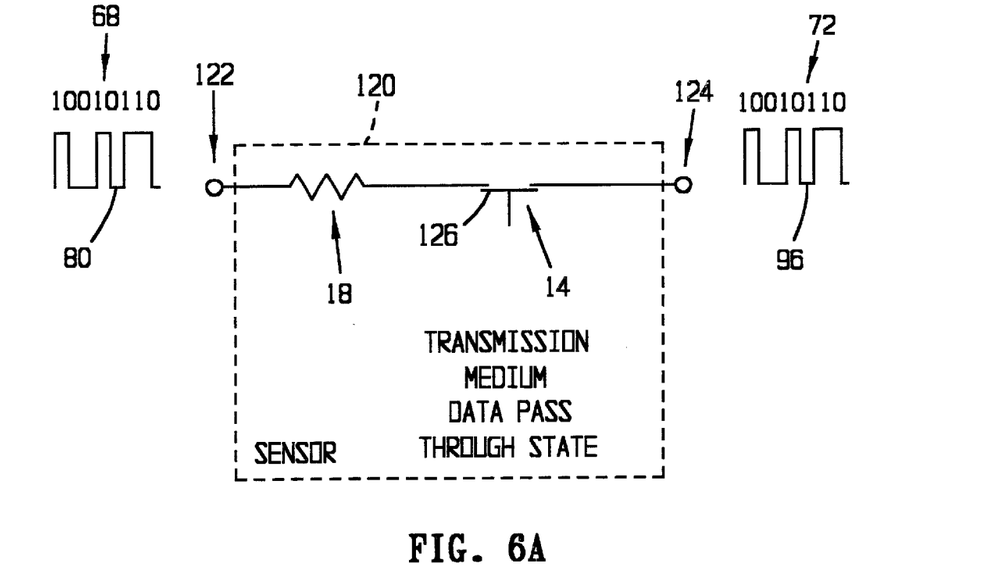
FIG. 6a is a schematic illustration of a sensor enabling a data loop back when a transmission medium is in a Data Pass Through State.
Figure 6B:
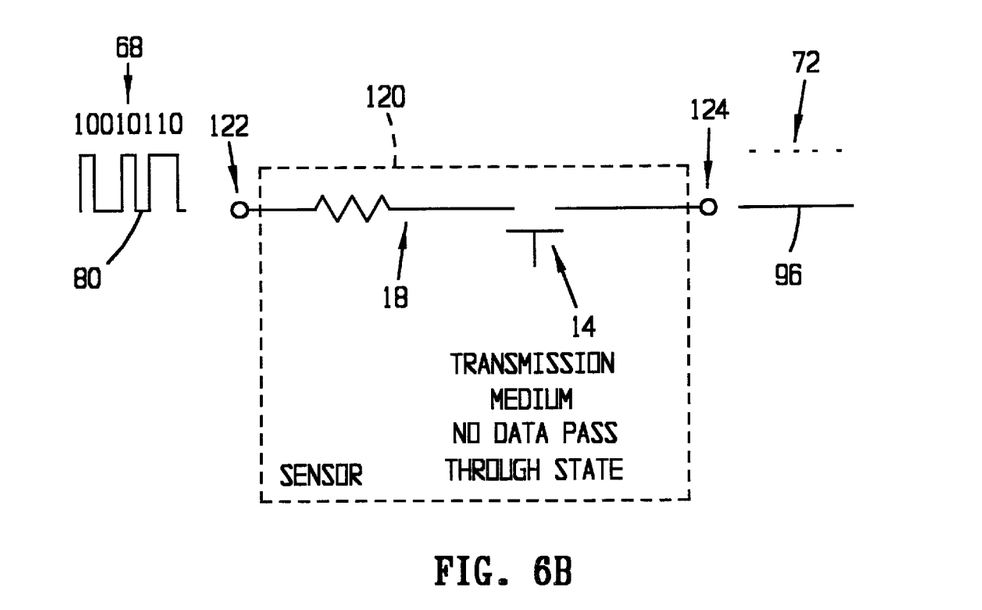
FIG. 6b is a schematic illustration of a sensor disabling a data loop back when a transmission medium is in a No Data Pass Through State.

Referring to FIGS. 5a and 5b, a simple detection circuit 18 is illustrated, wherein the switch 126, i.e. the transmission medium 14, forms part of a data shunt in order to selectively pull the output 124 of the sensor to logic ground 128. As illustrated in FIG. 5a, when the switch 126 is open, the data signal 80 passes from the input 122 through the sensor 120 and to the output 124 as an identical signal 96. The transmission medium 14 is in a Data Pass Through State and the sensor 120 is enabling a data loop back. When the switch 126 is closed to form a data shunt as shown in FIG. 5b, the signal 96 is pulled to logic ground 128. If the switch 126 is normally closed (FIG. 5b), then the system is designed so that an external event opens the data shunt, i.e. influences the transmission medium 14 in a Data Pass Through State (FIG. 5a). The microcontroller 22 verifies that the output data signal 96 from the sensor 120 is identical to the input data signal 80 to the sensor 120 and verifies that the anticipated external event occurred. FIGS. 6a and 6b illustrate another simple detection circuit 18 without a data shunt in which the input data signal 80 is identical to the output data signal 96 when the switch 126 is closed to form a data path and is not identical when the switch 126 is open. The transmission medium 14 is in the Data Pass Through State and the sensor 120 is enabling data loop back when the switch 126 is closed. If the switch 126 is normally closed, the microcontroller 22 verifies that the output data signal 96 is identical to the input data signal 80 and verifies that the anticipated 1W external event has not occurred. Other designs for either normally open or normally closed switches may be used to create the desired logic to control a particular system based on the state of a particular transmission medium 14.

Many non-proximity detection applications are available since any transmission medium 14, the presence or absence of which is influenced by an external event, may provide a means to detect the external event. A broad category of non-proximity based applications is fluid detection. Any fluid that is at least as conductive as water can be used as a data transmission medium 14. Referring to FIGS. 3, 6a, 6b, 8 and 9 if a first probe 130 is connected to SENSORx_DATA_OUT and a second probe 132 is connected to SENSORx_DATA_IN, and if both probes 130 and 132 are immersed in a conductive fluid functioning as the transmission medium 14, the input data signal 80 will be looped back as output data signal 96. The microcontroller 22 verifies that fluid is present between the probes by verifying that the output data signal 96 is identical to the input data signal 80, i.e. the transmission medium 14 is in the Data Pass Through State. Thus, probes 130, 132 could be used, for example, to detect the fluid level in a tank or the thickness of ice in a commercial ice cube-making machine and in a cold drink dispenser's ice bank. Alternatively, as illustrated in FIG. 7, one probe 130 could be connected across SENSORx_DATA_OUT and SENSORx_DATA_IN and a second probe could be connected to a logic ground to form a data shunt and disable the data loop back when the fluid contacts both probes.

Figure 7:
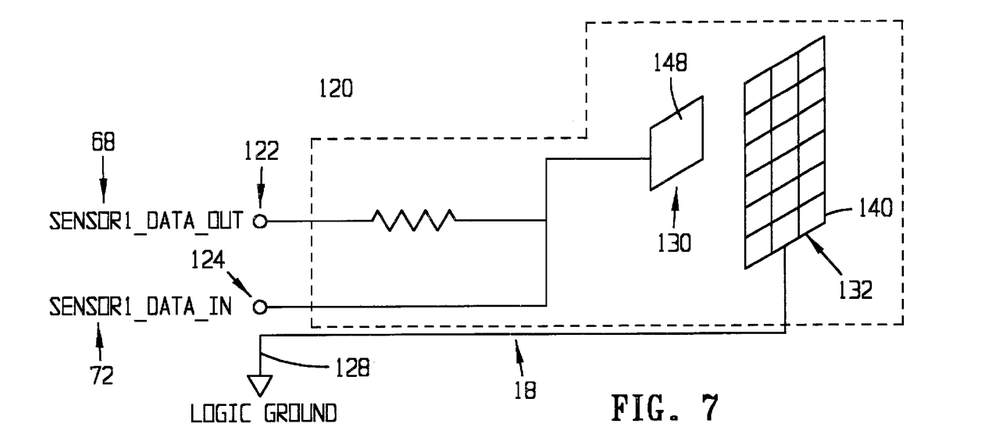
FIG. 7 is a schematic illustration of a detection circuit for an ice cube maker using the sensor arrangement illustrated in FIGS. 5a and 5b.
Figures 8, 9:
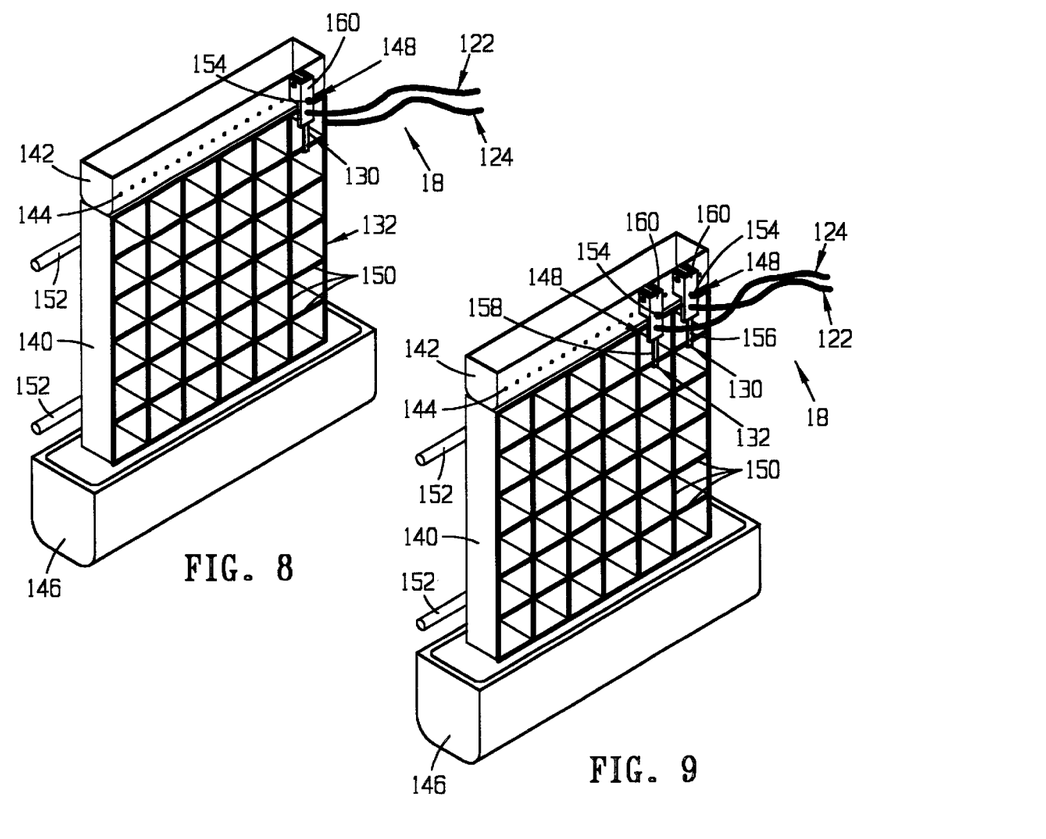
FIG. 8 illustrates an embodiment of the ice cube maker using a sensor arrangement illustrated in FIGS. 6a and 6b.
FIG. 9 illustrates an alternative embodiment of an ice cube maker using a sensor arrangement illustrated in FIGS. 6a and 6b.

FIGS. 7–9 illustrate an ice cube maker, including an ice cube grid 140, a water trough 142 with holes 144 positioned above the grid 140, a reservoir trough 146, and a sense plate 148. The grid elements 150 determine the cube width, height, and thickness. The grid 140 is thermally connected to evaporation coils 152 of refrigeration equipment. To produce ice cubes, the refrigerant is circulated through the evaporator coils 152 to cool the ice cube grid 140 well below the freezing point of water. Water is delivered through holes 144 in the water trough 142, runs down over the ice cube grid 140 and flows into the grid cavities due to the Coanda effect. Excess water is collected in the reservoir trough 146 and recirculated back to the water trough 142. Individual cubes are formed within the grid cavities as the sheets of water freeze. Ice begins to bridge the barriers or grid elements 150 between cavities after the cavities are filled. The refrigeration and water sheeting are stopped when the cubes reach the desired thickness. The cubes usually are harvested into a storage bin by running hot refrigeration gas through the evaporator coils so as to warm the grid enough to release the cubes.

FIG. 7 shows an ice cube maker generally wired according to the schematic of FIGS. 5a and 5b. The transmission medium 14 in FIG. 7 is the water/ice that forms between the sense plate 148 and the elements of the ice cube grid 140, whereas the transmission medium 14 in FIGS. 5a and 5b is the switch 126. SENSOR1_DATA_OUT 68 is connected to SENSOR1_DATA_IN 72 through a load resistor to form the data path. SENSOR1_DATA_IN 72 is also connected to the sense plate 148. The ice cube grid 140 is connected to the detection circuit logic ground 128. The transmitted serial data stream 12, i.e. the input data signal 80 to the sensor, is received at SENSOR 1_DATA_IN 72 as the received data stream 16, i.e. the output data stream 96 from the sensor, as long as there is an air gap between the sense plate 148 and the ice cube grid 140. The growing ice cubes and ice bridges between the cubes force the water sheet out. When the water sheet makes contact with the sense plate 148, the transmission medium 14 enters a No Data Pass Through State and the data signal is shunted to logic ground 128. The microcontroller 22 determines that the ice cubes are at the desired thickness since the received serial data stream 16 no longer matches the transmitted serial data stream 12.

FIG. 8 shows an ice cube maker generally wired according to the schematic of FIGS. 6a and 6b which does not use a data shunt. Again, the transmission medium 14 in FIG. 8 is the water/ice that forms between the sense plate 148 and the grid element 150, whereas the transmission medium 14 in FIGS. 6a and 6b is the switch 126. The sense plate 148 is wired to SENSOR1_DATA_OUT 68 and the grid element 150 is wired to SENSOR1_DATA_IN 72 (polarity is not important). The transmission medium 14 is in the No Data Pass Through State until the water/ice contact both the sense plate 148 and grid element 150 which, similarly to FIG. 6a, induces the transmission medium 14 into the Data Pass Through State to enable the input data signal 80 to pass through as the output data signal 96. The sense plate 148 functions as a first probe 130 and the grid element 150 functions as a second probe 132. FIG. 8 shows the sense plate 148 hinged to the water trough 142 and arranged to provide a gap between the sense plate 148 and the grid element 150. An adjustment screw 154 is used to adjust the gap between the sense plate 148 and the grid element 150 to set the desired thickness of the ice cubes.

FIG. 9 shows an alternative ice cube maker embodiment that uses two sense plates 148. Each sense plate 148 is hinged to the water trough 142 and has an adjustment screw 154 to set the desired thickness of the ice cubes. One of the sense plates 148 has a first contact 156 that functions as a first probe 130. The other of the sense plates 148 has a second contact 158 that functions as a second probe 132. The contacts 156 and 158 are both bonded to nonconductive holders 160. The contacts 156, 158 are wired to SENSOR1_DATA_OUT 68 and SENSOR1_DATA_IN 72 (polarity is not important). The transmission medium 14, i.e. water/ice, is in the No Data Pass Through State until the water on the growing ice cubes contact both the first contact 156 and the second contact 158 at which time, similarly to FIG. 6a, the transmission medium 14 enters the Data Pass Through State and enables the input data signal 80 to pass through as the output data signal 96 to signal that the anticipated external event has occurred.

Noise is effectively filtered out by the control program operating within the microcontroller 22 by comparing and verifying the received digital data 92 against the transmitted digital data 80. Methods used by the control program to detect and filter optical noise are disclosed in greater detail below.

Figure 10:
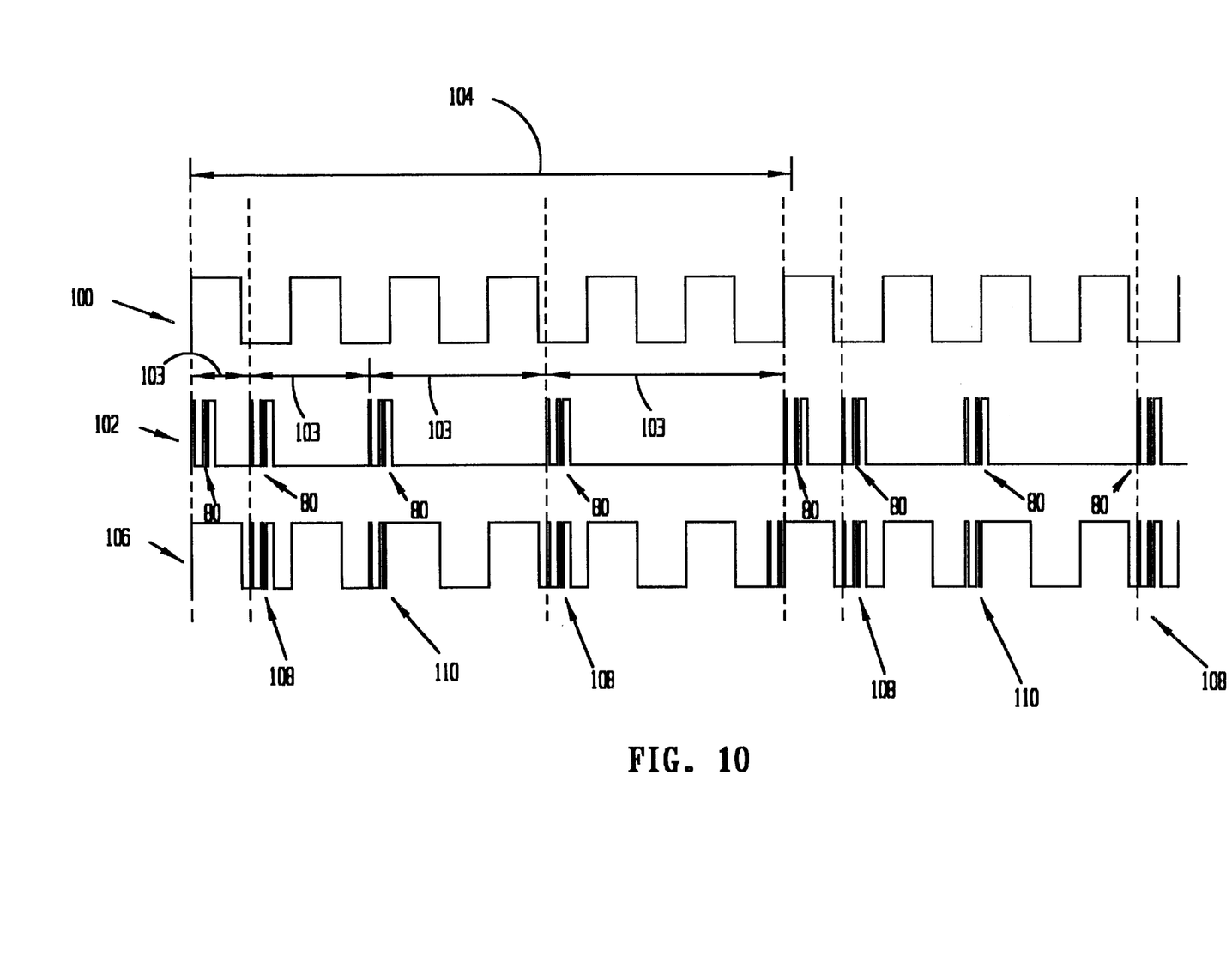
FIG. 10 illustrates a timing diagram for a first digital error detection method, wherein the timing diagram shows periodic noise signals, transmitted data signals sent at gradually increasing intervals while sweeping a periodic time band, and the combination of the noise and data signals.
Figure 11:
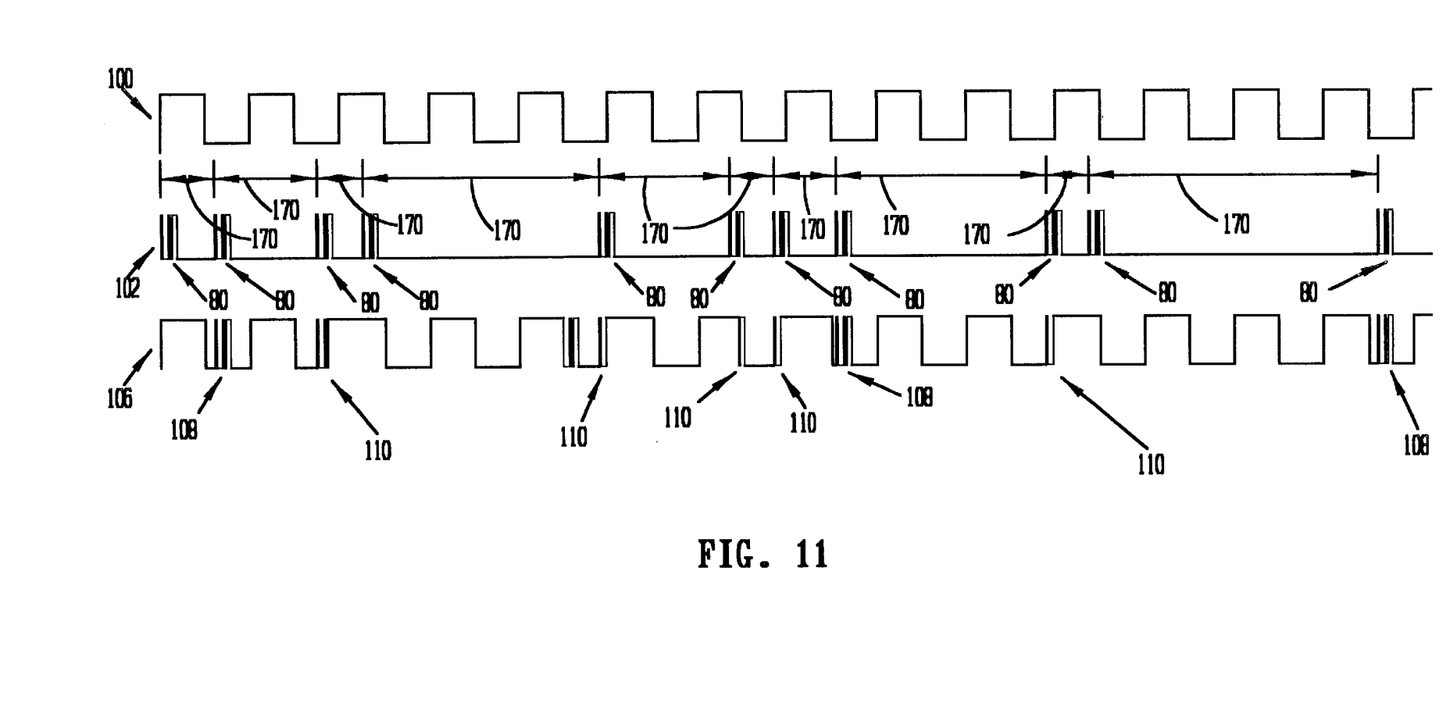
FIG. 11 illustrates a timing diagram for a second digital error detection method, wherein the timing diagram shows periodic noise signals, the transmitted data signals sent at random intervals, and the combination of the noise and data signals.

The present invention can detect and filter noise using multiple digital error detection methods. Two preferred embodiments or methods are described below. The noise either may be steady (DC level) noise caused by steady sources of interference, or it may be intermittent noise or periodic noise. FIGS. 10 and 11 illustrate a periodic noise signal 100 that approximates a square wave. In the first method for filtering out noise shown in FIG. 10, the microcontroller 22 transmits a series of serial data streams 80 shown as signal 102, the intervals 103 of which are gradually increased while sweeping a periodic time band 104. If the transmitted signal 102 is passed through, the combination of the noise signal 100 and the transmitted signal 102 results in signal 106. Valid digital data 108 is detected and verified by the microcontroller 22 when a noise signal 100 is not present. Invalid digital data 110 is detected when a noise signal 100 is present. The transmission medium 14 is determined to be in the Data Pass Through State when the microcontroller 12 verifies a valid serial data stream 108 and is determined to be in the No Data Pass Through State when the microcontroller 12 receives invalid digital data 110. The transmitted signal interval 103 is reset and the sweeping begins as before at the beginning of each periodic time band 104. The rate of increase of the data burst interval is varied so as not to be harmonic with a periodic noise signal 100. In the second method for filtering out noise shown in FIG. 11, the microcontroller generates and transmits bursts of data at random intervals 170. The term "random," as used in the application, incorporates computer generated "pseudo random" numbers produced through algorithms, The transmission of data at random intervals avoids duplicating the frequency or any harmonic frequencies of the noise signal 100.

Figure 12:
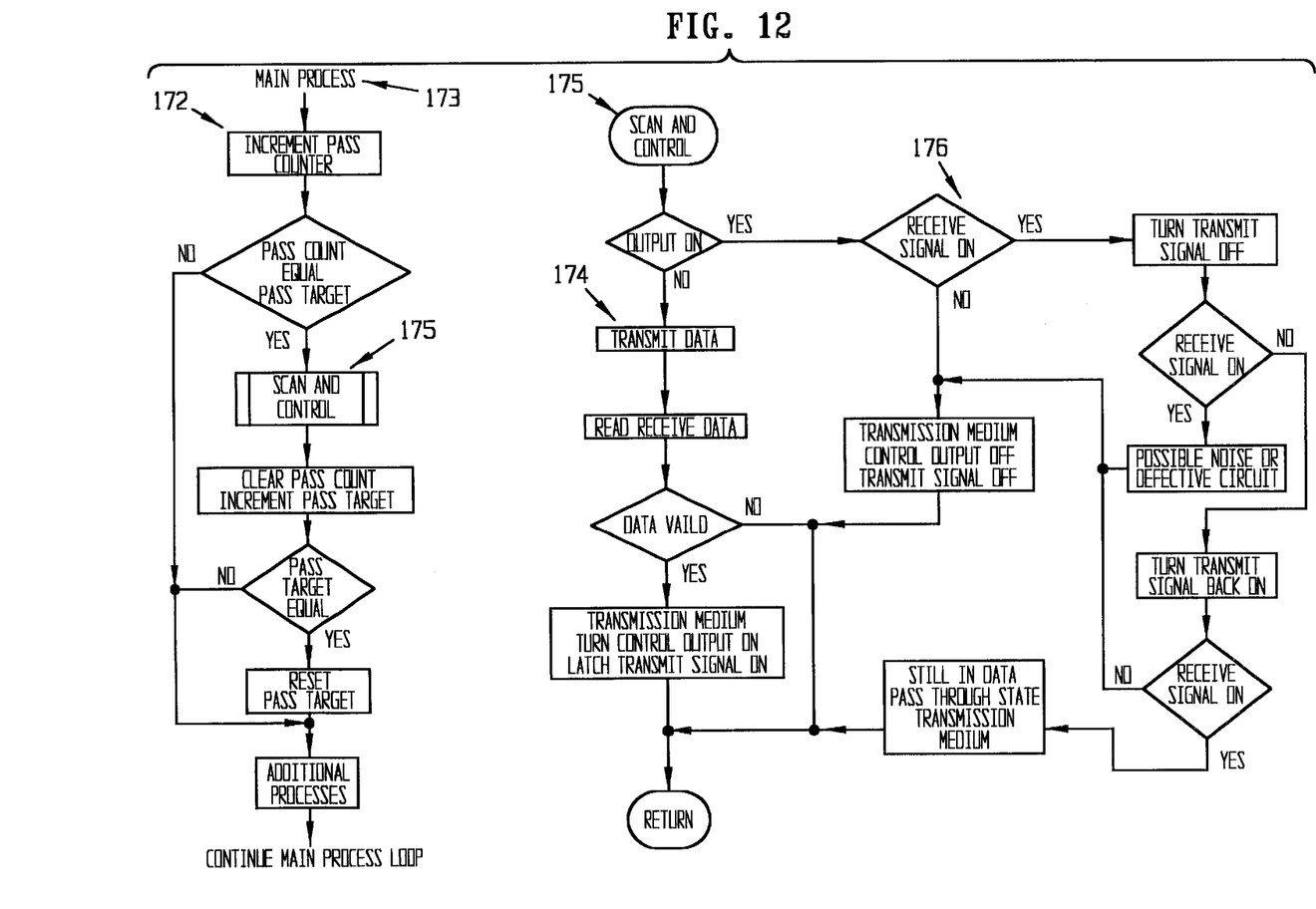
FIG. 12 illustrates a flow diagram of the first software routine used for the first digital error detection method shown in the timing diagram of FIG. 10, wherein said software routine sends, receives, and validates digital data.
Figure 13:
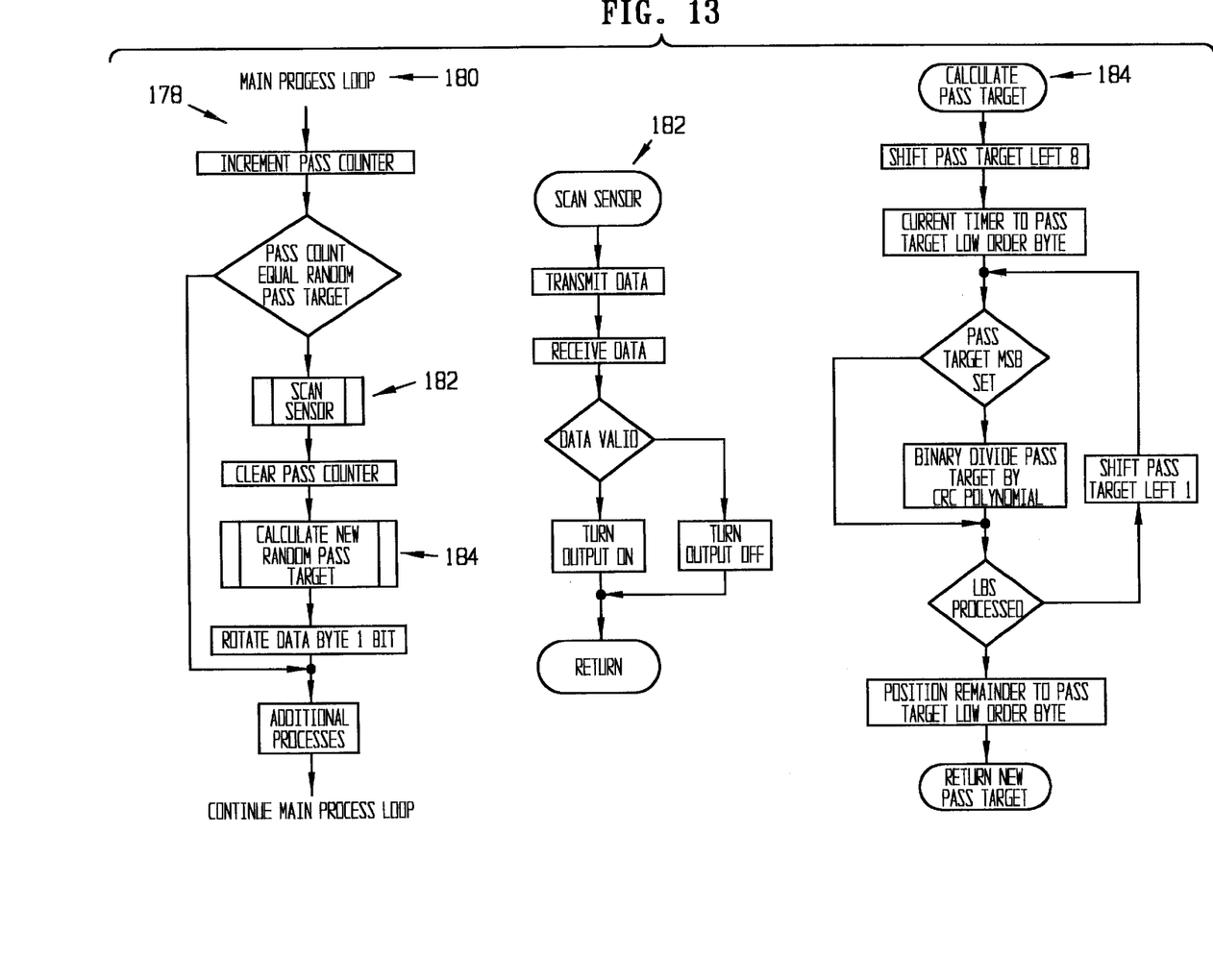
FIG. 13 illustrates a flow diagram of the second software routine used for the second digital error detection method shown in the timing diagram of FIG. 11, wherein said software routine sends, receives, and validates digital data.

The first software routine 172 used in the first method of digital error detection is illustrated in the flow diagram of FIG. 12. This routine 172 includes a Main Process loop 173 that calls a Scan and Control sub process 175 that basically operates within either a Scan Sensor Module 174 or a Latch Module 176. The Main Process loop 173 contains an interval generator function that determines the interval 103 between successive scans or generated serial data streams 80. The interval generator sweeps a periodic time band 104 by setting a pass target number to zero and incrementing the pass target number after each scan until the pass target number equals 63. When the pass target number is incremented to 64, it is reset to zero to start sweeping a new periodic time band 104.

In the Scan Sensor Module 174, the microcontroller 22 sends the transmitted serial data streams, receives serial data streams, and checks or verifies that the received serial data is valid by comparing it to the transmitted serial data. If the data is not valid either because of noise or the because the transmission medium 14 is in the No Data Pass Through State, the microcontroller 22 continues to operate in the Scan Sensor Module 174 and transmits serial data streams. If the data is valid because the transmission medium 14 is operating in the Data Pass Through State, the microcontroller 22 turns the control output on and enters the Latch Module 176 by transmitting steady state signals rather than bursts of digital data.

In the Latch Module 176 the microcontroller 22 toggles its transmit signal on and off and checks the resulting receive signal to determine whether the transmission medium 14 is in the Data pass Through State or the No Data Pass Through State. The microcontroller 22 stays in the latch module 176 when the transmission medium is still in the Data Pass Through State. When the transmission medium 14 is in the No Data Pass Through State, or when noise is detected, the microcontroller 22 turns the control output off and returns to the scan sensor module 174 where it transmits serial data streams rather than steady state signals. The microcontroller 22 determines that a transmission medium 14 is in the Data Pass Through State if the receive signal is on when the transmit signal is on and the receive signal is off when the transmit signal is off, that noise is present if the received signal remains on when the transmit signal is turned off, and that the transmission medium 14 is not present if the receive signal is off whenever the transmit signal is on. An executive scheduler controls the detection control routine.

In this first embodiment, the data source is taken from the lower four bits of a stored memory location. The value of these four bits can be algorithmically altered to form its complement. An eight-bit source is transmitted by first serially transmitting the four-bit data source, complementing the data source, and then transmitting the resulting four bits. It is very unlikely that random optical noise would duplicate this signal. Additionally, the eight-bit data source can be complemented between transmissions.

The second software routine 178 used in the second digital error detection method is illustrated in FIG. 12. The routine 178 of the second method of digital error detection includes a Main Process loop 180 that calls a Scan Sensor sub process 182 and an interval generator or Calculate Pass Target 184 sub process. The Scan Sensor sub process sends, receives and validates serial data streams from the detection circuits 18. The Calculate Pass Target sub process generates a random pass target number equal to or greater than zero and less than sixty-four. The Main Process loop 180 runs continuously and increments a pass count variable for each loop it makes until the pass count variable equals the pass target number. When the pass count variable equals the pass target number, the Main Process loop 180 calls the Scan Sensor sub process 182. The random interval between sensor scans shown in FIG. 11 is random because the generated pass target number is random. The microcontroller generates the pass target number by performing a cyclical redundancy check (CRC) on constantly varying data. A preferred method for generating the pass target number includes performing the following steps: (1) Obtaining a starting binary number or seed "n" from the microcontroller's free running clock, wherein "n" is defined by the equation "$0 \leq n > 255$;" (2) Forming a sixteen bit data block by multiplying the number "256;" (3) Generating the random number "r" by dividing the data block with a six-bit polynomial divisor, $2^5+2^4+2^2+1$, wherein "r" is defined by the equation "$0 \leq r > 64$;" (4) Creating a new pseudo-random sixteen bit data block by multiplying the random number "r" by the number "256" and adding the current value of the free running clock; and (5) Returning to Step Three. The execution sequence varies, causing the number of executed instructions and consumed clock cycles to vary as well. Therefore, the pseudo randomization of the data block is achieved in the fourth step where the value of the free running clock is added.

In the second embodiment, a data byte is generated by taking the lower four bits of a memory location (low-order nibble) followed by the upper four bits of a memory location (high-order nibble). The data byte is rotated one bit before transmitting each serial data stream. The control output is turned on whenever valid data is detected and is turned off whenever invalid data is detected.

Table 1 compares the two methods of digital error detection shown in the timing and flow diagrams of FIGS. 10 and 12 and FIGS. 11 and 13.

TABLE 1

| Components of Embodiments | Sweeping Intervals (First Embodiment) | Random Intervals (Second Embodiment) |
|---|---|---|
| Data Transmission | Shift out 4 bits. Calculate the complement. Shift out the complement of the 4 bits. | Shift out 8 bits. Rotate the byte by 1 bit before next transmission. |
| Data Reception | Bits are read serially and compared to the transmitted bit. | Bits are read serially and compared to the transmitted bit. |
| Interval Generation | Set Pass Target to zero. Increment Pass Target after each sensor scan. Reset to zero after 63 sensor scans. | Random Pass Target calculation initially seeded with the product of the system timer and 256. Generate a new pass target after each scan by using the product of the last pass target value and 256 plus the current system timing value. System scan intervals are based on a random number of mail loop passes which randomly varies from 0 to 63. |
| Control Output ON | The control output is turned on whenever valid data is detected during a scan. | The control output is turned on whenever valid data is detected during a scan. |
| Latch Mode | Latch Mode is enabled upon valid data detection and upon the control output being on. | Not used. |
| Control Output OFF | Latch is tested on each scan. Latch failure indicates noise or no container. The control output is turned off whenever there is a latch failure. | The control output is turned off whenever invalid data is detected during a scan. |

A significant portion of the microcontroller time can be spent in the data transmit and receive activity. In addition, transmission via single bit-to-port transfers presents some internal timing problems. One alternative is to use a microprocessor with an on-chip UART (universal asynchronous receiver-transmitter). The UART relieves the microcontroller of all the data transmission essentials. The desired data pattern is simply loaded into the UART and transmitted when desired. The UART can simultaneously receive the returned data into its receive buffer, allowing the data verification to be a simple byte to byte compare. This embodiment is capable of using significantly longer and/or more complex data patterns and using higher transmission rates to further improve noise rejection.

Another embodiment incorporates data line drivers (RS 232 or RS 422) with the transmitter/receiver units so that, with a suitable local power source, the transmitter/receiver units could be mounted at a considerable distance from the microcontroller or microprocessor (up to 4000 feet in the case of RS 422). The communications link in the present invention is over one meter in length. This embodiment could be used as a computer peripheral connected to a standard communications port on a typical personal computer. The detection data pattern could be formed from pure ASCII encoded characters.

Another embodiment adds a multiplexing method to the microprocessor so multiple sensors or detection circuits, each monitoring a separate location, could easily be incorporated. More sensors allow the flexibility to adapt to various requirements of different controlled equipment and processes.

The apparatus and methods of this invention have particular utility used in conjunction with commercial and institutional food service beverage and ice dispensing systems, medical/pharmaceutical dispensing systems, automated manufacturing and production systems, food processing systems, packaging systems, and a variety of other commercial, industrial, municipal and residential systems that utilize one or more mechanical, electrical, optical, or similar sensors to function properly.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

That which is claimed is:

1. A detection apparatus, comprising:
   (a) a device adapted for transmitting a transmitted serial data stream and receiving a received serial data stream;
   (b) a sensor adapted for receiving said transmitted serial data stream from said device, returning said received serial data stream to said device when a transmission medium is in a Data Pass Through State, and not returning said received serial data stream to said to device when said transmission medium is in a No Data Pass Through State, said transmission medium being influenced by an external event; and
   (c) said device verifying said received serial data stream against said transmitted serial data stream to verify said transmission medium is in said Data Pass Through State and to determine whether said external event has influenced said transmission medium.

2. The detection apparatus of claim 1, wherein said device asynchronously transmits successive serial data streams, said successive serial data streams being separated by a time interval.

3. The detection apparatus of claim 2, wherein said time interval is gradually increased during a predetermined periodic time band.

4. The detection apparatus of claim 2, wherein said time interval is random.

5. The detection apparatus of claim 1, wherein said device includes a processor and a software program operating within said processor, said software program transmitting said transmitted serial data stream, receiving said received serial data stream, and verifying said received serial data stream against said transmitted serial data stream.

6. The detection apparatus of claim 5, wherein said software program performs steps for each transmitted serial data stream, said steps including:
   (a) building a data byte comprised of eight bits;
   (b) serially shifting said data byte one bit at a time from a suitable output port of said processor, said shifting of said data byte occurring at a predetermined data rate to form said transmitted serial data stream;

(c) serially reading said received serial data stream on a bit by bit basis from a suitable input port of said processor when said transmission medium is in said Data Pass Through State; and (d) verifying said received serial data stream against said transmitted serial data stream.

7. The detection apparatus of claim 6, wherein said data byte is encoded.

8. The detection apparatus of claim 1, wherein said detection apparatus is a fluid detection apparatus and said transmission medium is a fluid.

9. The detection apparatus of claim 8, wherein said fluid detection apparatus detects a predetermined ice thickness for an ice making machine.

10. The detection apparatus of claim 9, wherein said ice making machine includes a plate cooled below the freezing point of water and a water supply adapted for running sheets of water over said plate to build ice of an increasing thickness, said sensor including at least one probe positioned with respect to said plate at a distance corresponding to a desired ice thickness, said transmission medium being influenced into either said Data Pass Through State or said No Data Pass Through State when water contacts said at least one probe.

11. The detection apparatus of claim 10, wherein said at least one probe includes a first probe connected to a data stream output port of said device and a second probe connected to a data stream input port of said device, said transmission medium being in said Data Pass Through State when water contacts both of said probes.

12. The detection apparatus of claim 11, wherein one of said probes is said plate.

13. The detection apparatus of claim 10, wherein said at least one probe includes a data path connected across a data stream output port and a data stream input port of said device, and further includes a first probe connected to said data path and a second probe connected to a logic ground to form a data shunt, said transmission medium being in said No Data Pass Through State when water contacts both of said probes.

14. The detection apparatus of claim 13, wherein one of said probes is said plate.

15. An asynchronous fluid detection apparatus, comprising:

(a) a device adapted for asynchronously transmitting a transmitted serial data stream and receiving a received serial data stream, said device including a processor and a software program operating within said processor, said software program transmitting said transmitted serial data stream, receiving said received serial data stream, and verifying said received serial data stream against said transmitted serial data stream;

(b) a sensor adapted for receiving said transmitted serial data stream from said device, returning said received serial data stream to said device when a transmission medium is in a Data Pass Through State, and not returning said received serial data stream to said device when said transmission medium is in a No Data Pass Through State, said transmission medium being influenced by an external event, said transmission medium being a fluid; and (c) said device verifying said received serial data stream against said transmitted serial data stream to verify said transmission medium is in said Data Pass Through State and to determine whether said external event has influenced said transmission medium.

16. An automatic ice making machine, comprising:

(a) a plate cooled below the freezing point of water;

(b) a water supply adapted for running sheets of water over said plate to build ice of increasing thickness;

(c) a device adapted for asynchronously transmitting a transmitted serial data stream and receiving a received serial data stream, said device including a processor and a software program operating within said processor, said software program transmitting said transmitted serial data stream, receiving said received serial data stream, and verifying said received serial data stream against said transmitted serial data stream, said software program performing steps for each transmitted serial data stream, said steps including:

(i) building an encoded data byte comprised of eight bits;

(ii) serially shifting said data byte one bit at a time from a suitable output port of said processor, said shifting of said data byte occurring at a predetermined data rate to form said transmitted serial data stream;

(iii) serially reading said received serial data stream on a bit by bit basis from a suitable input port of said processor; and (iv) verifying said received serial data stream against said transmitted serial data stream;

(d) a sensor adapted for receiving said transmitted serial data stream from said device, returning said received serial data stream to said device-when a transmission medium is in a Data Pass Through State, and not returning said received serial data stream to said device when said transmission medium is in a No Data Pass Through State, said transmission medium being influenced by an external event, said transmission medium being water, said sensor including at least one probe positioned with respect to said plate at a distance corresponding to a desired ice thickness, said transmission medium being influenced when water contacts said at least one probe; and (e) said device verifying said received serial data stream against said transmitted serial data stream to verify said transmission medium is in said Data Pass Through State and to determine whether said external event has influenced said transmission medium, wherein said external event occurs when ice is formed to a desired thickness.

17. A method for detecting an external event, comprising the steps of:

(a) transmitting transmitted serial data streams;

(b) selectively returning the transmitted serial data streams as received serial data streams when a transmission medium is in a Data Pass Through State, the transmission medium being influenced by an external event;

(c) receiving said received serial data streams; and (d) verifying said received serial data streams against said transmitted serial data streams to determine if the external event has influenced the transmission medium.

18. The method for detecting an external event of claim 17, wherein said transmitted serial data streams are asynchronous transmitted serial data streams.

19. The method for detecting an external event of claim 17, further comprising the step of encoding transmitted serial data streams.

20. The method for detecting an external event of claim 17, wherein the external event is a fluid level and fluid forms the transmission medium.

21. The method for detecting an external event of claim 20, wherein the external event is a predetermined thickness of ice, said method further comprising the steps of sheeting water over a cold surface to build ice on the cold surface and harvesting the ice after the predetermined thickness of ice is detected.

22. A method for automatically making ice cubes, comprising the steps of:
 (a) sheeting water over a cold grid to form ice cubes;
 (b) detecting the thickness of the ice cubes by:
  (i) generating digitally encoded, transmitted serial data streams;
  (ii) asynchronously transmitting the transmitted serial data streams;
  (iii) selectively returning the transmitted serial data streams as received serial data streams when a transmission medium is in a Data Pass Through State, wherein the transmission medium is water and is influenced when the ice cube is at the predetermined thickness;
  (iv) reading the received serial data streams; and
  (v) verifying the received serial data streams against the transmitted serial data streams to determine the status of the external event; and
 (c) harvesting the ice cubes upon detecting that the ice cubes have a predetermined thickness.

* * * * *